US008971950B2

(12) United States Patent
Lamm et al.

(10) Patent No.: US 8,971,950 B2
(45) Date of Patent: Mar. 3, 2015

(54) METHOD AND DEVICE FOR TRANSMISSION POWER CONTROL

(75) Inventors: Anders Lamm, Molndal (SE); Anders Persson, Kode (SE); Anders Hansson, Goteborg (SE); Tomas Svadling, Hammaro (SE); Jinhua Liu, Beijing (CN); Xinyu Gu, Beijing (CN); Hai Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 212 days.

(21) Appl. No.: 13/369,559

(22) Filed: Feb. 9, 2012

(65) Prior Publication Data

US 2013/0115998 A1 May 9, 2013

Related U.S. Application Data

(60) Provisional application No. 61/555,496, filed on Nov. 4, 2011.

(51) Int. Cl.
*H04B 7/00* (2006.01)
*H04W 52/58* (2009.01)
*H04W 52/24* (2009.01)
*H04W 52/60* (2009.01)
*H04W 52/22* (2009.01)

(52) U.S. Cl.
CPC ............ *H04W 52/221* (2013.01); *H04W 52/58* (2013.01); *H04W 52/241* (2013.01); *H04W 52/60* (2013.01)
USPC ........... 455/522; 455/524; 455/525; 370/252; 370/318

(58) Field of Classification Search
CPC ..................................................... H04W 52/04
USPC ............. 455/69, 522, 524, 525; 370/252, 318
See application file for complete search history.

(56) References Cited

U.S. PATENT DOCUMENTS 7,603,135 B2 * 10/2009 Takaki ........................ 455/522
2012/0135778 A1 * 5/2012 Tian ............................ 455/522

FOREIGN PATENT DOCUMENTS

| EP | 1617566 A1 | 1/2006 |
| GB | 2383503 A | 6/2003 |
| WO | 2004059875 A1 | 7/2004 |

OTHER PUBLICATIONS

International Search Report issued on Mar. 20, 2012, in application No. PCT/EP2012/052023, 3 pages.
International Preliminary Report on Patentability with Written Opinion of the International Searching Authority cited in PCT/EP2012/052023 issued May 6, 2014, 7 pages.

* cited by examiner

*Primary Examiner* — Tuan H Nguyen
(74) *Attorney, Agent, or Firm* — Rothwell, Figg, Ernst & Manbeck, P.C.

(57) ABSTRACT

The embodiments herein relate to a method in a base station for adjusting transmission power in a communications network. The base station determines a first number m; P of historical transmit power control, TPC, commands based on a signal power and an interference level. The base station determines a second number 2k; n+Q of current TPC commands based on the first number m; P of historical TPC commands, or based on the first number m; P of historical TPC commands and a third number n−K of signal power and interference level pairs. The base station transmits a sequence of TPC commands comprising the first number of historical TPC commands and the second number of current TPC commands to the user equipment to adjust the user equipment's transmission power.

27 Claims, 8 Drawing Sheets

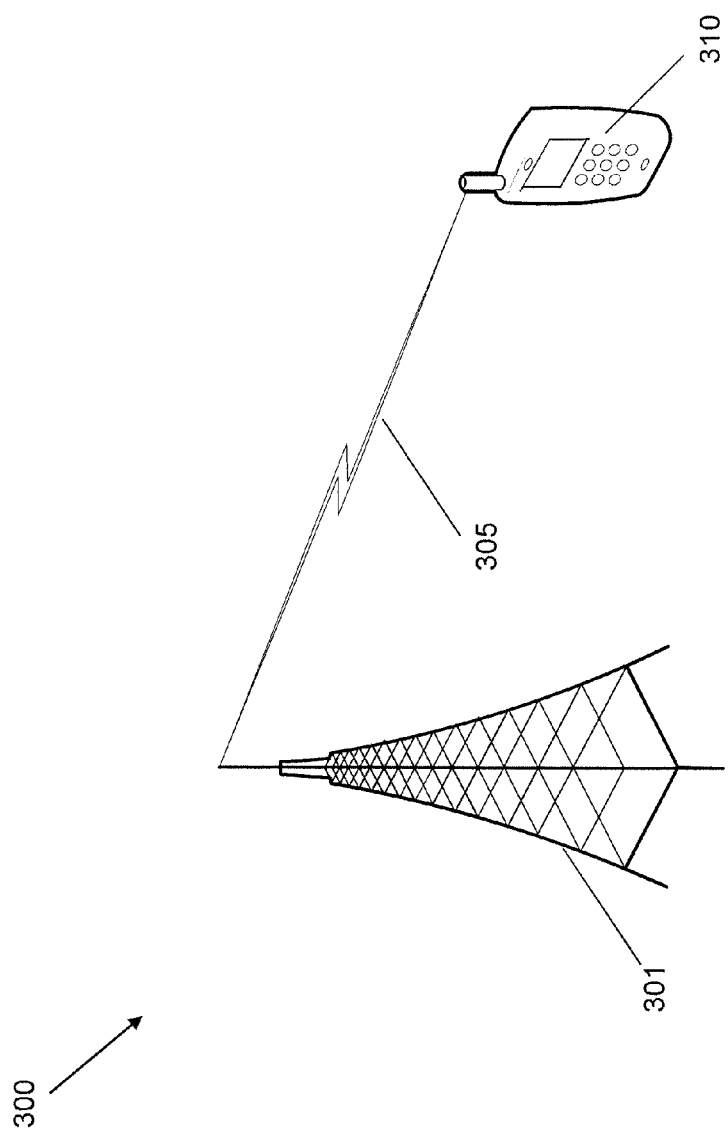

METHOD AND DEVICE FOR TRANSMISSION POWER CONTROL

This application claims the benefit of U.S. Provisional Application No. 61/555,496 filed Nov. 4, 2011. The entirety of said provisional application is incorporated by reference herein.

TECHNICAL FIELD

Embodiments herein relate generally power control. More particularly the embodiments herein relate to using Transmission Power Control (TPC) commands for power control.

BACKGROUND

In a typical cellular radio system, a wireless terminal(s) communicates via a Radio Access Network (RAN) to one or more Core Networks (CN). The wireless terminal is also known as mobile station and/or User Equipment (UE), such as mobile telephone, cellular telephone, smart phone, tablet computer and laptop with wireless capability. The user equipment may be, for example, portable, pocket-storable, hand-held, computer-comprised, or vehicle-mounted mobile devices which communicate voice and/or data via the RAN. In the following, the term user equipment is used when referring to the wireless terminal.

The RAN covers a geographical area which is divided into cell areas, with each cell area being served by a base station, e.g. a Radio Base Station (RBS), which in some networks is also called NodeB, B node, evolved Node B (eNB) or Base Transceiver Station (BTS). The term base station will be used in the following when referring to any of the above examples. A cell is a geographical area where radio coverage is provided by the base station at a base station site. The base station communicates over an air interface operating on radio frequencies with the user equipment within range of the base station.

In some versions of the RAN, several base stations are typically connected, e.g. by landlines or microwave, to a Radio Network Controller (RNC). The RNC, also sometimes termed a Base Station Controller (BSC), supervises and coordinates various activities of the plural base stations connected thereto. The radio network controllers are typically connected to one or more CNs.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a RAN using WCDMA for user equipments. The Third Generation Partnership Project (3GPP) has undertaken to evolve further the UTRAN and GSM based RAN technologies.

In a WCDMA network or similar a key component is to maintain a received Signal-to-Noise plus Interference Ratio (SINR) at a constant level to preserve the quality of the received information at a desired level. SINR is a measure of signal strength relative to background noise and interference. The base station receives a signal from the user equipment and measures the SINR of the received signal, then the measured SINR value is compared with a SINR threshold-value to generate a Transmission Power Control (TPC) command. The TPC command is sent to the user equipment and indicates to the user equipment whether it should increase or decrease its transmitting power. The user equipment adjusts its transmitting power based on the received TPC command. The adjustment may take place for example once for a time slot.

Transmit power control is important for a smooth operation of a WCDMA system or similar and it is used in order to keep the received information quality at a set level. In general, the base station sends a TPC command to the user equipment to adjust the power at the user equipment. Two fundamental methods are specified for this purpose: Outer loop power control and inner loop power control. The purpose of the inner loop power control is to minimize the power and interference of ongoing connections by keeping the received Signal to Interference-plus-Noise Ratio (SINR) at a target level. The purpose of the outer loop power control is to adjust the target SINR for the inner loop so that the resulted Block Error Rate (BLER) of the data blocks may meet a certain BLER target. BLER is a ratio of the number of erroneous blocks to the total number of received blocks. SINR is the ratio of the received strength of the desired signal to the received strength of undesired signals, noise and interference. SINR is calculated using the following equation $$SINR = \frac{P}{I+N}$$

where P is the signal power, I is the interference power and N is the noise power.

SINR is commonly used in wireless communication as a way to measure the quality of wireless connections. The energy of a signal fades with distance, which is defined by the path loss. A wireless communication network has to take a lot of parameters into account such as e.g. the background noise, interfering strength of other simultaneous transmission, and the SINR attempts to create a representation of this aspect.

If the user equipment 107 moves towards the base station 101, the signal strength increases and causes increased interference level as seen by other user equipment's. In this case, the base station 101 needs to send an instruction to the user equipment 107 to reduce its transmission power as it moves towards the base station 101. If the user equipment 107 moves away from the base station 101 it will suffer from increased path loss. In this case, the base station 101 needs to send an instruction to the user equipment 107 to increase its transmission power as it moves away from the base station 101.

According to some embodiments of 3GPP the user equipment's transmission power should be updated each 0.667 ms based on a signal quality measurement done in the base station. 3GPP describes two different inner loop power control algorithms. A schematic figure of the inner loop power control is presented in FIG. 1. In FIG. 1 the base station 101 sends an UpLink (UL) TPC command 103 to the user equipment 107 comprising instructions to increase or decrease its transmission power. The user equipment 107 adjusts its transmission power according to the TPC command and sends a signal according to the adjusted transmission power, TX power 108, back to the base station 101. Uplink is defined as the direction from the user equipment 107 to the base station 101, and downlink is defined as the direction from the base station 101 to the user equipment 107.

In algorithm 1 for inner loop power control, every TPC command is handled individually resulting in 1 dB user equipment Dedicated Physical Control CHannel (DPCCH) transmit power increase/decrease every slot. For example, in WCDMA, the increase/decrease is +/−1 dB. IN LTE, it may be other values, such as e.g. +2, +1, 0, −1.

The transmit powers of other physical channels are set relatively to the DPCCH channel with a corresponding pre-defined power offset. Hence the transmit power of other physical channels are also adjusted in the same scale when the DPCCH power is adjusted. DPCCH is the physical channel on which the control signaling is transmitted, both on the uplink by the user equipment 107 to the base station 101 and on the downlink by the base station 101 to the user equipment 107.

According to algorithm 1, when the user equipment 107 is not in soft handover, i.e. it is only connected to one cell during a call, only one TPC command will be received from the base station 101 in each slot, in which a TPC command is known to be present. In this case, the value of TPC command is derived as follows:

if the received TPC command is equal to 0 then TPC command for that slot is −1,
if the received TPC command is equal to 1, then TPC command for that slot is +1.

In algorithm 2 for inner loop power control, five consecutive TPC commands must be recognized as increase to generate one 1 dB up, or five consecutive TPC commands must be recognized as decrease to generate one 1 dB down. When the user equipment 107 is not in soft handover, only one TPC command will be received in each slot. In this case, the user equipment 107 shall process received TPC commands on a 7-slot cycle, where the sets of 7 slots shall be aligned to the frame boundaries and there shall be no overlap between each set of 7 slots. The value of TPC command is derived as follows:

For the first 4 slots of a set, TPC command=0.
For the 7 slot of a set, the user equipment 107 uses hard decisions on each of the 7 received TPC commands as follows: (1) If all 7 hard decisions within a set are 1, then TPC command is set to +1 in the fifth slot; (2) If all 7 hard decisions within a set are 0, then TPC command is set to −1 in the fifth slot; (3) Otherwise, the TPC command is set to 0 in the fifth slot.

The hard decisions mentioned above are related to binary information and decides whether a received bit is a one or zero.

The basic idea with the 3GPP inner loop power control is to combat the user equipment's 107 own channel variations and keep the signal quality on a predefined level. The predefined level may be seen as a target quality value. The target may be predefined or semi-static to its nature.

For example, the block error rate (BLER) may be chosen to be defined as the measure of signal quality. A target of e.g. BLER=10% may be set as the predefined value towards which the system performance may be steered, using the TPC commands.

Algorithm 1 above suits normal speech user equipment's 107 quite well if they are transmitting on power levels well below the thermal noise. But with the introduction of Enhanced UpLink (EUL), user equipment's 107 transmitting with high data rate on the uplink, the power level from individual user equipment's 107 might reach above the thermal noise and interfere with other transmitting user equipment's 107 in the network. EUL provides high data rates capacity for packet data services on the uplink. In a multi-user equipment scenario it is in most cases more important to avoid creating interference to other user equipment's than to combat the user equipment's 107 own channel variations.

The base station 101 issues the TPC command to adjust the power at the user equipment 107. However, the adjustment takes place after some delay, referred to as the TPC delay. This delay is typically the propagation and the processing time at the user equipment 107 and the base station 101. The processing time may be for example the SINR estimation time in the base station 101 and/or the TPC command decoding time in the user equipment 107.

The TPC delay may also be described as the time duration from the uplink slot. For a short Transmission Time Interval (TTI) such as e.g. 2 ms TTI, the TPC delay based on the measured SINR of which the TPC is generated, to the user equipment 107 transmits an uplink slot with an adjusted power with the said TPC command. This may cause algorithm 1 to over control the network as the response time of the network due to the TPC delay is comparable to or even longer than the TTI. TTI refers to the duration of a transmission on the radio link.

The negative impact on the system and user equipment performance is larger for a larger TPC delay, e.g. D=2 slots, which is especially essential for some advanced receivers such as Serial Interference Cancellation (SIC) or Parallel Interference Cancellation (PIC) receivers. The letter D represents the delay. See FIG. 2 for illustration of TPC delay. FIG. 2 shows the TPC commands generated by the base station 101. In this example, three TPC commands are illustrated, TPC n, TPC n+1 and TPC n+2, with the respective base station Rx timing n, n+1 and n+2, where n is a positive integer. The user equipment 107 receiving the TPC commands is also illustrated in FIG. 2. The user equipment's 101 Tx timing is n+D, n+D+1 and n+D+2 for the corresponding to the applied TPCs, TPC n, TPC n+1 and TPC n+2. As mentioned above, the D is the TPC delay and D is an integer number of slots, such as for example 0, 1, 2, 3, . . . .

The TPC delay may typically depend on the processing time needed for SINR estimation, uplink/downlink timing and propagation distance between the user equipment and the base station. With future advanced receivers such as interference cancellation receivers the processing time may be even higher and thus the TPC delay may be as high as 8 time slots.

Algorithm 2 above is expected to be very slow, has problems to follow a fading channel and is quite sensitive to SINR estimation errors. For instance, the user equipment 107 has high risk of suffering from radio link failure in case of sudden uplink quality degradation with Algorithm 2.

Once a dedicated channel is established, the inner and outer loop work together to maintain the required BLER. A switch between Algorithm 1 and 2 requires Radio Resource Control (RRC) signaling, which means a cost of both signaling and delay. The RRC protocol is being used to configure and control the radio resource between the base station 101 and the user equipment 107.

SUMMARY

An object of embodiments herein is therefore to obviate at least one of the above disadvantages and to provide improved performance in a communications network.

According to a first aspect, the object is achieved by a method in a base station for adjusting transmission power in a user equipment when the base station communicates with the user equipment over a communications link. The method comprises the actions of: determining a first number m; P of historical transmit power control, TPC, commands based on a signal power and an interference level; determining a second number 2k; n+Q of current TPC commands based on the first number m; P of historical TPC commands, or based on the first number m; P of historical TPC commands and a third number n−K of signal power and interference level pairs; and transmitting a sequence of TPC commands comprising the first number of historical TPC commands and the second number of current TPC commands to the user equipment to adjust the user equipment's transmission power, preferably such the net-rate of power change provided by the sequence of TPC commands is different compared to the net-rate of power change provided the historical TPC commands.

According to a second aspect, the object is achieved by a base station configured to adjust transmission power in a user equipment and to communicate with the user equipment over a communications link. The base station comprises: a determining unit configured to: determine a first number m; P of historical transmit power control, TPC, commands based on a signal power and an interference level; and to determine a second number 2k; n+Q of current TPC command based on the first number m; P of historical TPC commands, or based on the first number m; P of historical TPC commands and a third number n−K of signal power and interference level pairs. In addition, the base station comprises a transmitting port configured to transmit a sequence of TPC commands comprising the first number of historical TPC commands and the second number of current TPC commands to the user equipment to adjust the user equipment's transmission power so as to alter the net-rate of power change provided per historical TPC command, preferably such the net-rate of power change provided by the sequence of TPC commands is different compared to the net-rate of power change provided the historical TPC commands.

By imposing restrictions on the transmitted sequence of TPC commands, the instability problem due to the TPC delay is addressed, and the transmission power control is improved.

Embodiments herein afford many advantages, of which a non-exhaustive list of examples follows:

An advantage of some embodiments herein is that, by controlling the net-rate of the power increase/decrease for the user equipment, system performance may be significantly improved.

Another advantage of some embodiments herein is reduced probability of so called power rushes in the cellular network. A power rush is an uncontrolled increase of the user equipment's transmit powers, caused by instability in the transmit power control loop.

A further advantage of some embodiments herein is that they provide significantly lower average Rise-over-Thermal (RoT) for a given cell throughput. RoT is the total power relative to the background thermal noise power: RoT= (P_other+N_0)/N_0

Another advantage of some embodiments is that, in combination with the Interference Suppression feature (IS), an up to 100% improvement in achievable cell throughput possible for cases where multiple user equipment's transmit simultaneously.

Furthermore, an advantage of some embodiments herein is that the interference in the network is reduced and the battery life of the user equipment is increased.

Another advantage of some embodiments herein is that use of TPC saves energy in the user equipment.

Furthermore, some embodiments herein provide the advantage of improved performance in terms of throughput.

Another advantage of some embodiments herein is that they have a low implementation cost.

The embodiments described herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments.

FIG. 3 is a schematic block diagram illustrating embodiments of a communication network.

Figure 1:
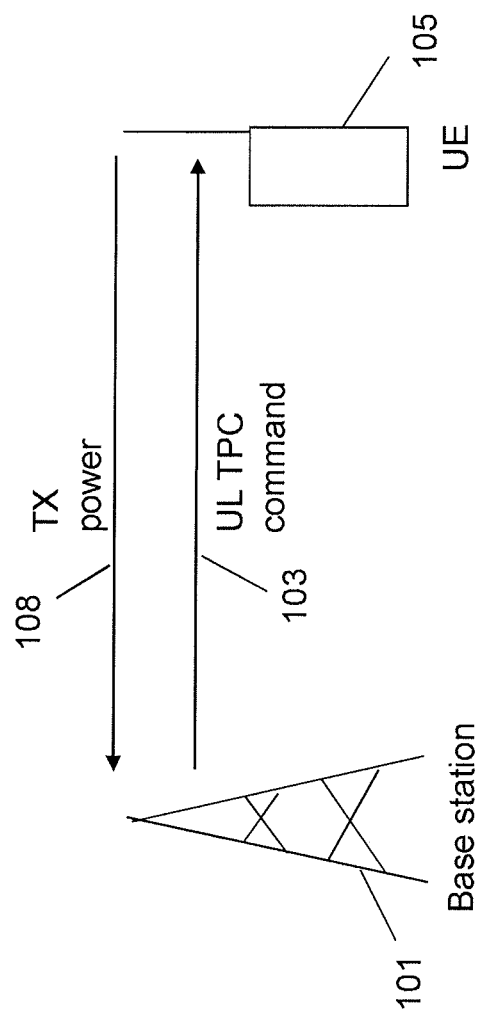
FIG. 1 is a schematic block diagram illustrating embodiments of an inner loop power control.
Figure 2:
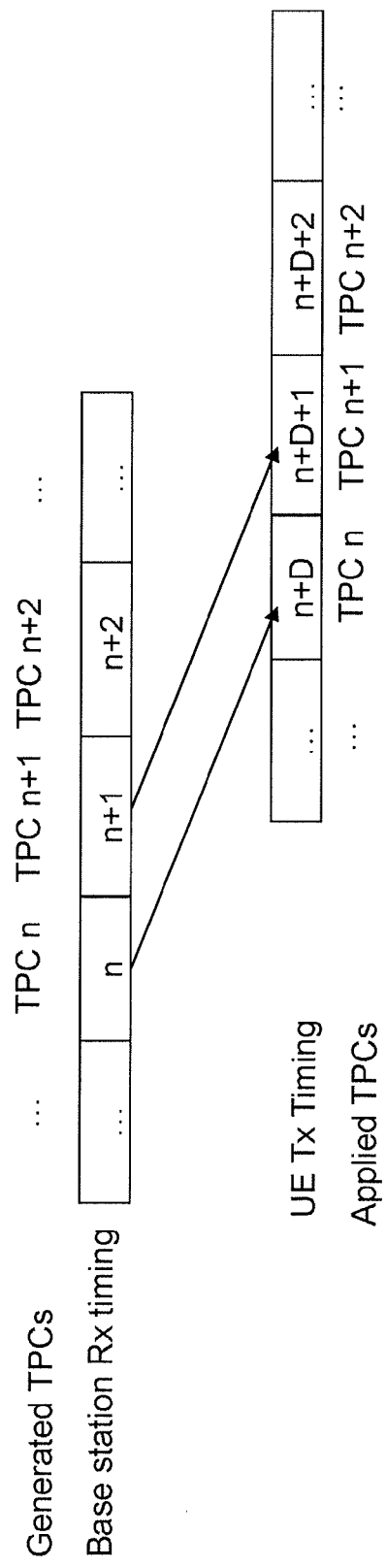
FIG. 2 is a schematic block diagram illustrating embodiments of TPC delay.
Figure 4A:
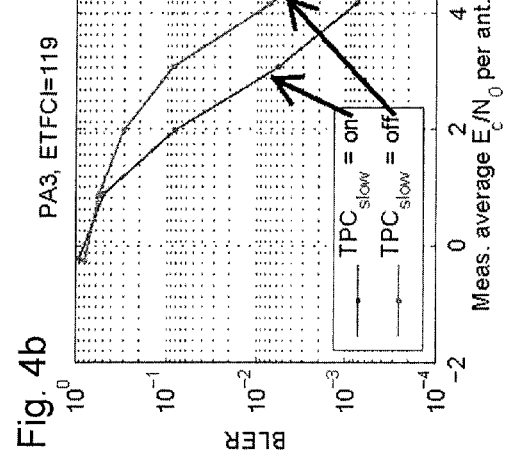
FIG. 4a-d are graphs illustrating link level gain.
Figure 4B:
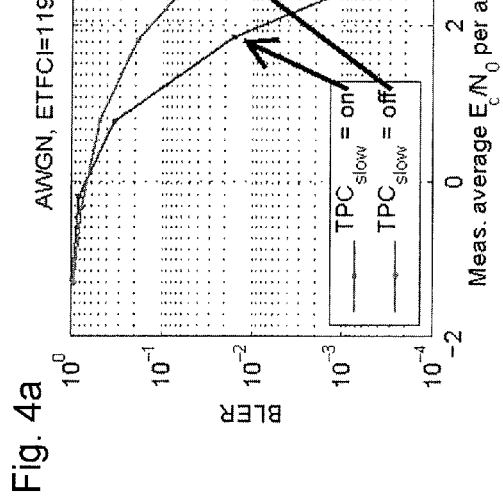
Figure 4C:
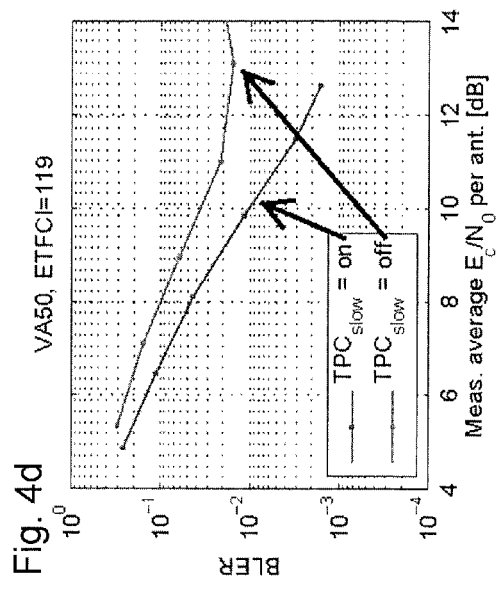
Figure 4D:
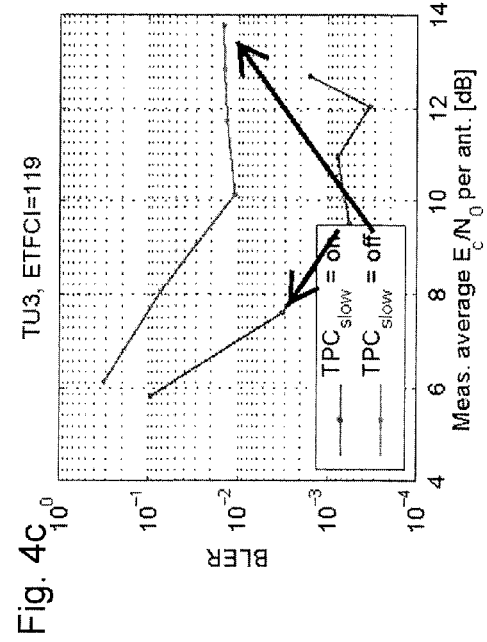

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to uplink power control, and in particular to: Adaptive rate power control; Handling in soft handover cases; Adaptation of the TPC power control pattern.

FIG. 3 depicts a communications network 300 in which embodiments herein may be implemented. The communications network 600 may in some embodiments apply to one or more radio access technologies such as for example LTE, LTE Advanced, WCDMA, Global System for Mobile Communications (GSM), high-speed uplink packet access (HSUPA) or any other 3GPP radio access technology.

The communications network 300 comprises a base station 301 serving a cell. The base station 301 may be a NodeB, an evolved NodeB (eNB), or any other network unit capable to communicate over a wireless communications link 305 with a user equipment 310 being present in the cell. The base station 301 may be referred to as BS in some of the figures.

The user equipment 310 may be any suitable communication device or computational device with communication capabilities capable to communicate with the base station over the communications link 305, for instance but not limited to mobile phone, smart phone, Personal Digital Assistant (PDA), tablet computer, laptop, MP3 player or portable DVD player (or similar media content devices), digital camera, or even stationary devices such as a PC. A PC may also be connected via a mobile station as the end station of the broadcasted or multicasted media. The user equipment 310 may also be an embedded communication device in e.g. electronic photo frames, cardiac surveillance equipment, intrusion or other surveillance equipment, weather data monitoring systems, vehicle, car or transport communication equipment, etc. The user equipment 310 is referred to as UE in some of the figures.

In the base station 301, it is preferred that the TPC function is always "on", and the base station 301 sends one or more TPC commands to the user equipment 310 at regular time intervals, e.g. at every slot which may be every 0.667 ms after initial attach of the user equipment 310 to the base station 301. The TPC command is sent from the base station 301 via a suitable type downlink channel to the user equipment 310. The TPC command may be for one or more slots. In some embodiments, the TPC command may be a sequence of sub-TPC commands, where each sub-TPC commands is for one slot.

Now, different embodiments of TPC commands to be sent from the base station 301 to the user equipment 310 will be described using an adaptive rate power control, i.e. a memory-less sequence generation and a memory based sequence generation.

(1) Adaptive Rate Power Control (1.1) Memory-Less TPC Sequence Generation

After the base station 301 has sent m number of original TPC commands, i.e. historical TPC commands, to the user equipment 310, the following 2k TPC commands, i.e. current TPC commands, is replaced by a concatenation of k TPC command pairs (−1, +1). Where m and k are positive integers. The m number of original TPC commands may be generated e.g. by comparing an estimated SINR against a target SINR. The estimated SINR and the target SINR is calculated by the base station. In some embodiments, the target SINR may be predefined in the base station 301.

For example, with m=1 and k=1 the following original sequence and modified sequence, after replacement by (−1, +1), is obtained, where x illustrates a TPC command:

Original TPC sequence: (x1, x2, x3, x4, x7, x6, x7, x8, x9, x10)

Modified TPC sequence: (x1, −1, +1, x4, −1, +1, x7, −1, +1, x10).

As seen above, after 1 normal TPC command (x1), the following 2×1 TPC commands (x2, x3) are replaced by (−1, +1). After the TPC command x4, the following x7 and x6 TPC commands are replaced by (+1, −1) etc.

For the example above, the maximum net-rate is reduced from 1 dB per time slot to 1 dB per three time slots, as the inserted (−1, +1) pair has a zero net contribution to the transmit power from the user equipment 310.

The parameter k may be determined as a function of the TPC delay and the TTI length over the communications link 305 being an air interface. For instance, the value of k may be larger for a larger TPC delay and/or shorter TTI length.

The whole modified TPC command sequence is transmitted from the base station 301 to the user equipment 310.

The user equipment 310 receives the TPC command sequence from the base station 101 and adjusts its transmission power based on the TPC command.

The transmit power may be adjusted by different values, measured in dB. For the example of WCDMA, the adjustment is given by the TPC command:

(1) TPC(n)=−1 ==>increase power by one dB
(2) TPC(n)=+1 ==>decrease power by one dB.

For the example of LTE it may be e.g. four different values, e.g. −1, 0, 1, 2 dB.

In addition to being applicable to WCDMA and LTE, the memory-less TPC sequence generation is also applicable to, LTE Advanced, GSM, WiMAX, HSUPA, or any other 3GPP radio access technology.

An advantage of the memory-less TPC sequence generation is that the base station 301 does not need to use any of its memory capacity to store TPC commands.

(1.2) Memory Based Sequence Generation

With memory based TPC sequence generation, the TPC commands for time slots n, n+1, . . . , n+Q is a function of the P previous/historical TPC commands and the estimated SINR in slot n, n−1, . . . , n−K. Here n, K and Q are positive integers and comprising the value zero: 0, 1, 2, 3, . . . . More generally, instead of the estimated SINR, other functions of the estimated received signal power and interference level may be used. With the memory base sequence generation, the base station 301 comprises a computer readable memory for storing the historic TPC commands. The memory may comprise all TPC commands sent from the base station 301 to the user equipment 310 after initial attach of the user equipment 310. Another alternative is that the memory may comprise the most recent TPC commands sent form the base station 301 to the user equipment, e.g. the ten most recent TPC commands or all TPC commands sent in the previous 7 seconds.

The memory based approach is applicable to LTE, which is a standard that has four different values for the TPC commands. The memory based approach is also applicable to WCDMA, LTE Advanced, GSM, WiMAX, HSUPA, or any other 3GPP radio access technology.

Note that the parameter set (Q, P, K) determines the input and output quantities of the TPC command generating function.

The user equipment 310 receives the TPC command from the base station 101 and adjusts its transmission power based on the TPC command. There may be many possible implementations of the function itself. Below is an example of such a function.

(1.2.1) Algorithm A

In this section an example algorithm is presented that takes the two previous TPC commands (P=2) and the estimated SINR in the current slot (K=0) into account to generate the TPC command for the current slot (Q=0).

| Example Algorithm |
| --- |
| If( TPC(n−2) == TPC(n−1) ) // Previous two commands are equal?<br>   TPC(n) = −TPC(n−1); // Toggle<br>else // SINR-based comparison<br>   if( SINR_estimate(n) > SINR_target )<br>      TPC(n) = +1; // Decrease power<br>   else<br>      TPC(n) = −1; // Increase power<br>   end if<br>end if |

For this example, assuming that the two previous TPC commands are +1 +1, the generated TPC command for the current time slot must be −1. Similarly, if the two previous TPC commands are −1, −1, the generated TPC command for the current time slot must be +1. If the two previous TPC commands are either +1, −1 or −1, +1, the generated TPC command for the current time slot is based on the comparison of the estimated SINR and the target SINR.

Also with this example, the maximum net-rate of the power control loop is reduced from 1 dB per time slot to 1 dB per three time slots.

Algorithm A may be applicable to WCDMA, or any other 3GPP standard with binary TPC-commands (+1, −1).

The user equipment 310 receives the TPC command from the base station 101 and adjusts its transmission power based on the TPC command.

The transmit power may be adjusted by different values, measured in dB. For WCDMA, the adjustment is given by the TPC command:

(a) TPC(n)=−1, increase power by one dB,
(b) TPC(n)=+1, decrease power by one dB.

For LTE it may be e.g. four different values, e.g. −1, 0, 1, 2 dB.

FIGS. 4a-d illustrates simulations of the link level gain that may be achieved by using Algorithm A in different radio channel conditions. In FIGS. 4a-d, the measured average E_C/N_0 per antenna measured in decibel is presented on the x-axis, and BLER is presented on the y-axis. In more detail, FIGS. 4a-d illustrates a simulated single-user BLER performance. TPC_slow=on means that Algorithm A is enabled, while TPC_slow=off means that the TPC commands are instead always generated by comparing the estimated slot SINR against the target SINR.

Figure 5:
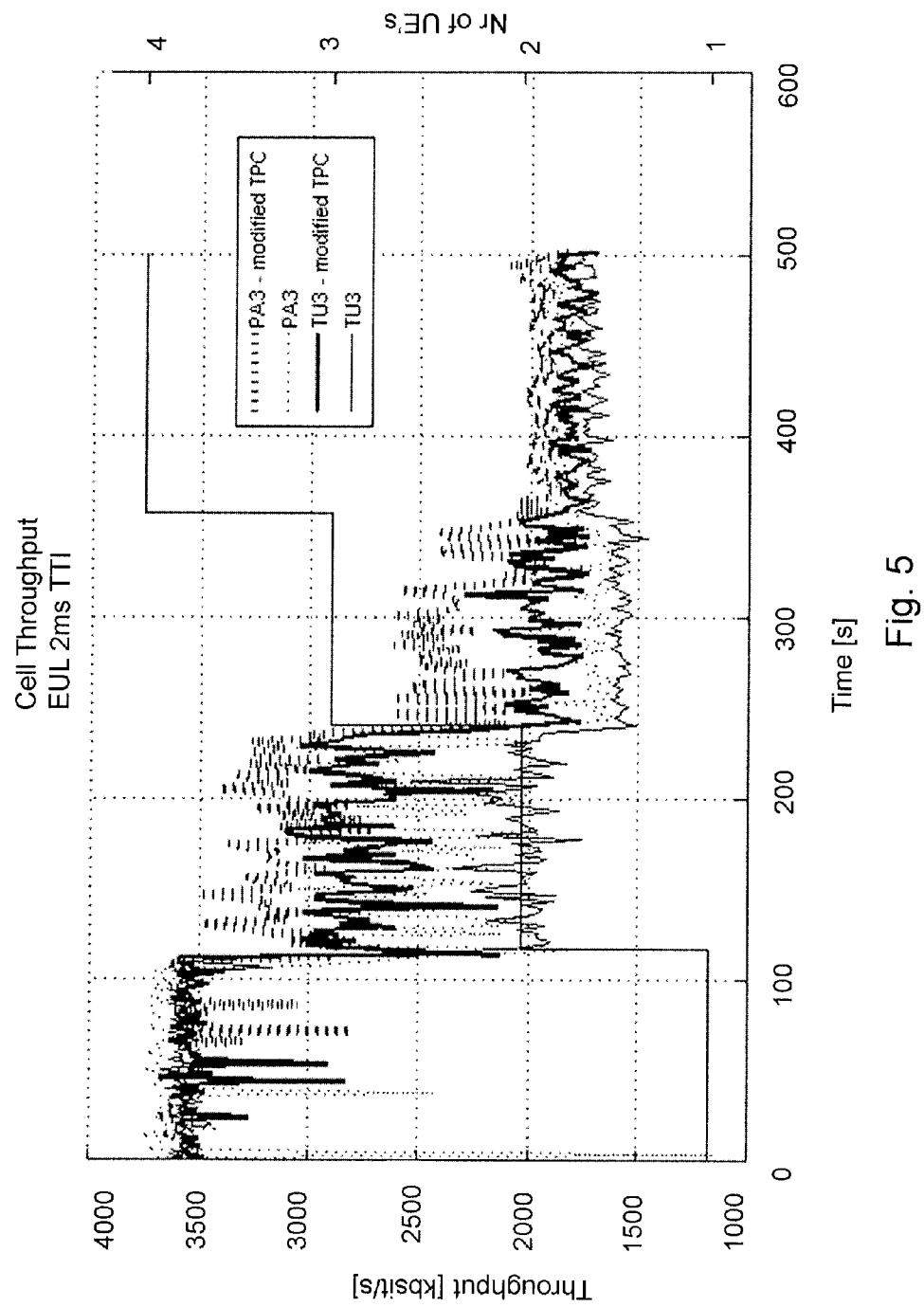
FIG. 5 is a graph illustrating embodiments of cell throughput gain.

FIG. 5 illustrates lab measurements of the cell throughput using Algorithm A. The time in seconds is presented on the x-axis and the throughput measured in kbits/s is presented on the y-axis of FIG. 5.

(2) Handling in Soft Handover Case

Soft handover refers to the case when the user equipment 310 is in an overlapping cell coverage area of more than one base station 301. During the soft handover, the user equipment 310 which is connected to two or more base stations 310 (note that only one base station 310 is shown in FIG. 3 for the sake of simplicity) is power controlled by all the base stations 301 to which it is connected. In other words, each connected base stations 301 transmits at least one TPC command to the user equipment 310. If the user equipment 310 is in soft handover mode there may be a risk that the TPC commands received from the different base stations 301 are shifted one or several time slots due to different TPC delays from the different base stations 301. If the power control algorithms proposed above are simultaneously used in more than one base station 301, there is a risk of a malfunctioning power control. This will now be exemplified using Algorithm A in Chapter 1.2.1

Assuming that two base stations 301 both intend to increase the soft handover user equipment's 310 transmit power. The TPC command sequence transmitted from a first base station is in the following referred to as Radio Link Set 1 transmitted (RLS 1_transmitted) and the TPC command sequence transmitted from a second base station is in the following referred to as RLS 2_transmitted. Using algorithm A in Section 1.2.1 the following TPC command sequences are transmitted:

RLS 1_transmitted: −1, −1, +1, −1, −1, +1, −1, −1, +1
RLS 2_transmitted: −1, −1, +1, −1, −1, +1, −1, −1, +1.

If the TPC delay is one slot higher for RLS 2 compared to RLS 1, the received TPC command sequences are:

RLS 1_received: −1, −1, +1, −1, −1, +1, −1, −1, +1
RLS 2_received: x, −1, −1, +1, −1, −1, +1, −1, −1.

Here x means any TPC command, it may be +1 or −1, it is known and it is not necessary to know the value of x. RLS 1_received is the TPC commands received from the first base station and RLS 2_received is the TPC commands received from the second base station. The received TPC commands, RLS 1_received and RLS 2_received, are logically combined by the user equipment 310. A received TPC-down command, e.g. +1, overrides a received TPC-up command, e.g. −1. The combined TPC commands are as follows: RLS combined: x, −1, +1, +1, −1, +1, +1, −1, +1.

Hence, the net-result is a decrease in output power, the opposite of the desired result. As a consequence, only one base station 301 is allowed to use the adaptive rate power control algorithms proposed in section 1. In some examples, the proposed algorithms may be used in the serving base station 301 only.

(3) Adaptation of the TPC Power Control Pattern

In some special cases, for instance, there is risk that the user equipment 310 will suffer from radio link failure or channel estimation problems. In such cases, the TPC command may be conditionally adapted and or the power control scheme may be conditionally switched to another power control scheme. An example is presented below.

A certain low bound of DPCCH SINR may be predefined. If the measured DPCCH SINR, i.e. SINK_low, thres, is lower than the low DPCCH SINR threshold, it means that the user equipment 310 may either have problem with the channel estimation quality for data demodulation or has the risk of radio link failure. As a consequence, the adaptive power control scheme may be given other input parameters than the currently used parameters or another power control scheme with a higher net-rate may be selected, e.g. such as Algorithm A described above.

Another DPCCH SIR threshold, i.e, SIR_good, thres, SIR_good,thres>SIR_low,thres, may be predefined. This DPCCH SIR threshold indicates that the DPCCH SIR is high enough and that the TPC command may be safely used. When the DPCCH SIR is higher than SIR_good,thres, the TPC command is used.

The thresholds may be different in different conditions, e.g. the different user equipment data rates. For instance, the uplink transmission with a higher modulation order and or coding rate requires a better channel estimation which means a higher DPCCH SINR is required in order for good enough channel estimation and further means that a higher SINR_low,thres and a higher SIR_good are needed.

Figure 6A:
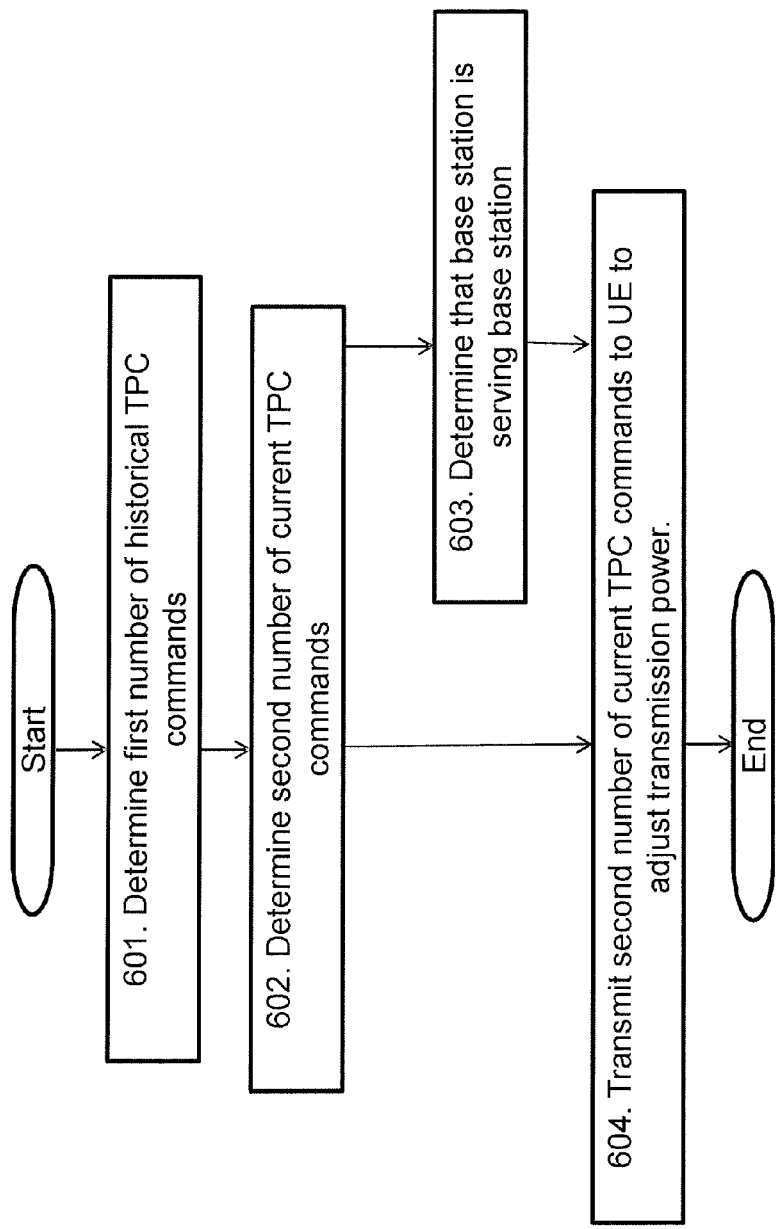
FIG. 6a-b are flow charts illustrating embodiments of a method in a base station.
Figure 6B:
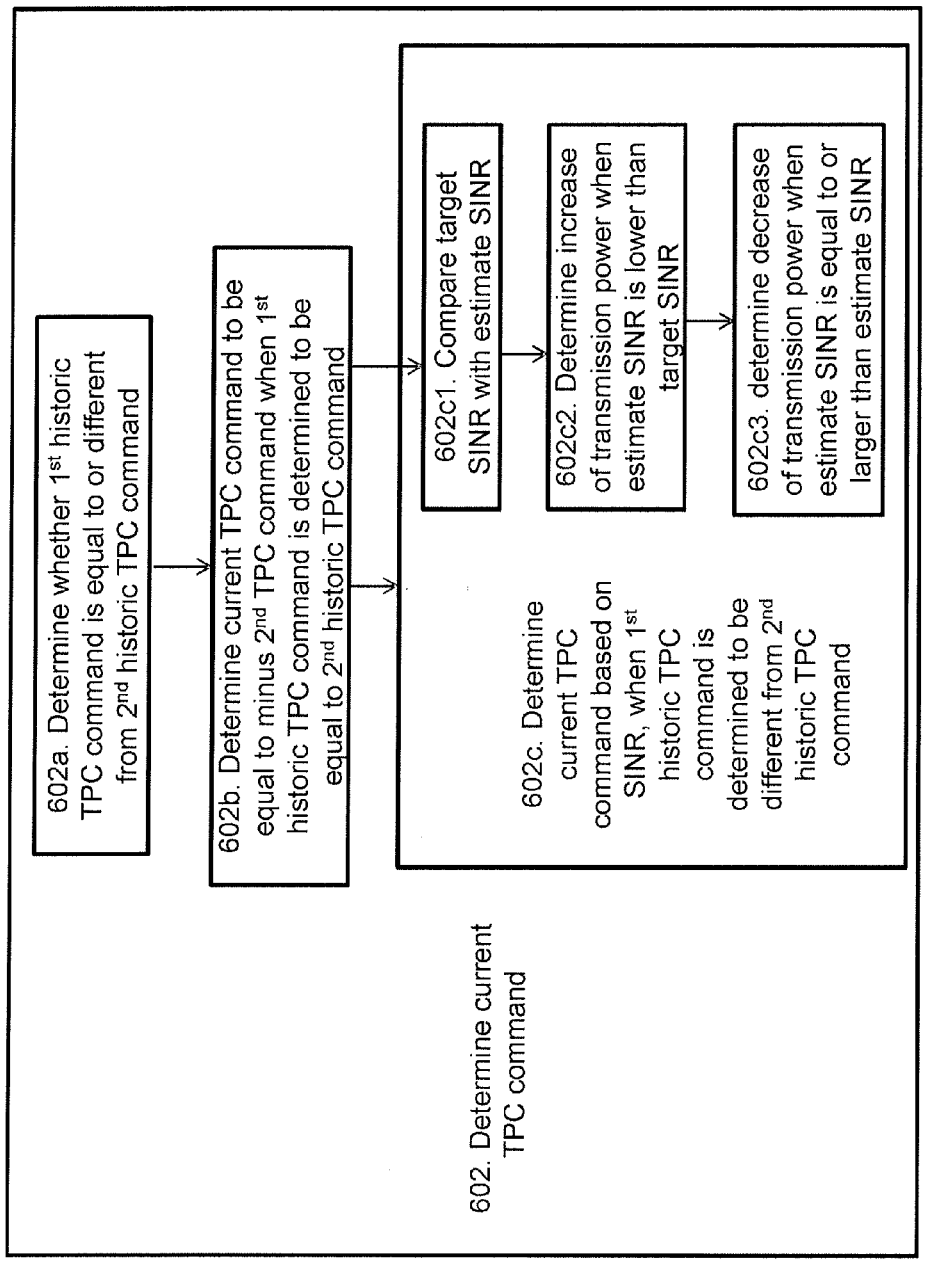

The exemplifying method described above will now be described seen from the perspective of the base station 301. FIGS. 6a-b are flowcharts describing the present method in the base station 301 for adjusting the user equipment's 310 transmission power in the communications network 300. FIG. 6a illustrates steps of the method, FIG. 6b illustrates an embodiment of step 602. As mentioned above, the base station is configured to communicate with a user equipment over a communications link 305. In some embodiments, communications link 305 is an uplink communications link, and the transmission power is output transmission power from the user equipment 310. In some embodiments, the communications network 300 is a wireless communications network 300. In some embodiments, communications network 300 is based on WCDMA, HSUPA, or LTE. The method comprises the following steps, which steps may be performed in any suitable order:

Step 601

This step is shown in FIG. 6a. The base station 301 determines a first number of historical TPC commands based on a signal power and an interference level. The first number may be m as referred to in section 1.1 describing the memory-less TPC sequence generation, or the first number may be P as referred to in section 1.2 describing the memory based sequence generation. The historical TPC commands may also be referred to as original TPC commands or previous TPC commands. m and P are constants and positive integer values.

Step 602

This step is shown in FIGS. 6a and 6b. The base station 301 determines a second number of current TPC commands based on the first number of historical TPC commands, or based on the first number of historical TPC commands and a third number n−K of signal power and interference level pairs. The second number of current TPC commands may be 2k as referred to in section 1.11 describing the memory-less TPC sequence generation, or the second number of current TPC commands may be n+Q as referred to in section 1.2 describing the memory based sequence generation. The second number of current TPC commands may, in some embodiments, be Q+1. The signal power and interference level pairs are for slots n, . . . , n−K. The n and K are constants and positive integer values. The third number may also be K+1.

In some embodiments, second number 2k or n+Q of current TPC commands is determined based on a TPC delay and a TTI length measured by the base station 301.

In some embodiments, the current TPC command is a predefined historical TPC command. In some embodiments, the predefined historical TPC commands are +1 and −1, where +1 indicates a decrease of the transmission power and −1 indicates an increase of the transmission power.

In some embodiments, the current TPC command is for one time slot, or the current TPC commands form a sequence of TPC commands where each TPC command is for one time slot.

Step 602a

This step is shown in FIG. 6b. This step is a substep of step 602. In some embodiments, the base station 301 determines whether a first historical TPC command is equal to or different from a second historical TPC command. The first historical TPC command is older than the second historical TPC command.

Using the example of algorithm A above, the base station 301 determines whether $TPC(n-2)=TPC(n-1)$, i.e. whether the previous two commands are equal.

In some embodiments, the first historical TPC command and the second historical TPC command are stored in a computer readable memory comprised in the base station 301.

Step 602b

This step is shown in FIG. 6b. This step is a substep of step 602 and a step to be performed after step 602a. In some embodiments, the base station 301 determines a current TPC command to be equal to minus the second historical TPC command when the first historical TPC command is determined to be equal to the second historical TPC command.

Using the example of algorithm A above, the base station 301 determines $TPC(n)=-TPC(n-1)$.

Step 602c

This step is shown in FIG. 6b. This step is a substep of step 602, and a step to be performed in case the first historical TPC command was not equal to the second historical TPC command in step 602b. In some embodiments, the base station 301 determines the current TPC command based on the SINR when the first historical TPC command is determined to be different from the second historical TPC command.

Step 602c1

This step is shown in FIG. 6b. This is a substep of step 602c. In some embodiments, the base station 301 compares a target SINR with an estimate SINR.

In some embodiments, target SINR is predefined in the base station and the estimate SINR is calculated by the base station based on a signal quality measurement done by the base station.

Step 602c2

This step is shown in FIG. 6b. This is a substep of step 602c and a step which is executed after step 602c1. In some embodiments, the base station 301 determines an increase of the transmission power when the estimate SINR is lower than the target SINR.

If $SINR\_estimate(n)<SINR\_target$, then $TPC(n)=-1$ the power should be increased.

Step 602c3

This step is shown in FIG. 6b. This is a subset of step 602c and a step which is executed after step 602c2. In some embodiments, the base station 301 determines a decrease of the transmission power when the estimate SINR is equal to or larger than the estimate SINR.

If $SINR\_estimate(n)>SINR\_target$. If $TPC(n)=+1$, the power should be decreased.

Step 603

This step is shown in FIG. 6a. In some embodiments, the base station 301 determines that the base station is a serving base station serving the user equipment 310. The current TPC command is transmitted to the user equipment to adjust the transmission power when the base station is determined to be the serving base station.

Step 604

This step is shown in FIG. 6a. The base station 301 transmits a sequence of TPC commands comprising the first number of historical TPC commands and the second number of current TPC commands to the user equipment 310 to adjust the user equipment's 310 transmission power, so as to alter the net-rate of power change provided per historical TPC command.

The sequence of TPC commands may be for example the modified TPC sequence described in chapter 1.1: (x1, −1, +1, x4, −1, +1, x7, −1, +1, x10).

Figure 7:
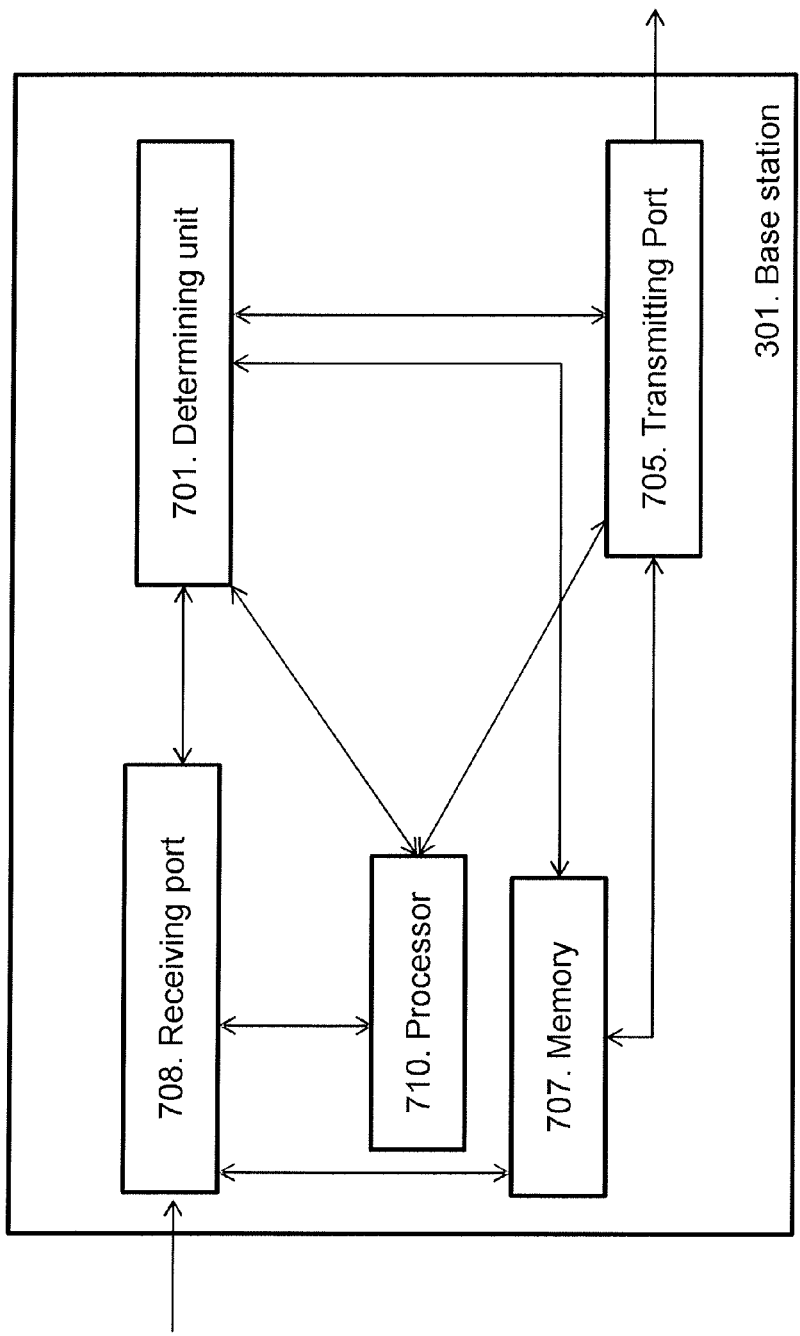
FIG. 7 is a block diagram illustrating embodiments of a base station.

To perform the method steps shown in FIGS. 6a-b for adjusting transmission power in the communications network 300 the base station 301 comprises an arrangement as shown in FIG. 7. As mentioned earlier, the base station 301 is configured to communicate with a user equipment 310 over a wireless communications link 305. The base station 301 comprises a determining unit 701 which is configured to determine a first number m; P of historical TPC commands based on a signal power and an interference level. The determining unit 701 is further configured to determine a second number 2k; n+Q of current TPC command based on the first number m; P of historical TPC commands, or based on the first number m; P of historical TPC commands and a third number n−K of signal power and interference level pairs. The third number may, in some embodiments, be K+1. In some embodiments, the current TPC command is a predefined historical TPC command. In some embodiments, the predefined historical TPC commands are +1 and −1, where +1 indicates a decrease of the transmission power and −1 indicates an increase of the transmission power. In some embodiments, the first number m; P of historical TPC commands and the second number 2k; n+Q of current TPC commands are constants and positive integer values. In some embodiments, the second number may be Q+1.

In some embodiments, the determining unit 701 is further configured to determine whether a first historical TPC command is equal to or different from a second historical TPC command. The first historical TPC command is older than the second historical TPC command. In some embodiments, the determining unit 701 is further configured to determine a current TPC command to be equal to minus the second historical TPC command when the first historical TPC command is determined to be equal to the second historical TPC command. In some embodiments, the determining unit 701 is further configured to determine a current TPC command based on a SINR when the first historical TPC command is determined to be different from the second historical TPC command. In some embodiments, the first historical TPC command and the second historical TPC command are stored in a computer readable memory 707 comprised in the base station 301.

In some embodiments, the determining unit 701 is further configured determine that the base station 301 is a serving base station serving the user equipment 310. The current TPC command is transmitted to the user equipment 310 to adjust the transmission power when the base station 301 is determined to be the serving base station.

In some embodiments, the determining unit 701 is further configured to compare a target SINR with an estimate SINR, determine an increase of the transmission power when the estimate SINR is lower than the target SINR, and to determine a decrease of the transmission power when the estimate SINR is equal to or larger than the estimate SINR. In some embodiments, the target SINR is predefined in the base station 301 and the estimate SINR is calculated by the base station 301 based on a signal quality measurement done by the base station 301.

In some embodiments, the determining unit 701 is configured to determine the second number 2k; n+Q of current TPC commands is based on a TPC delay and a transmission time interval, TTI, length measured by the base station 301. The current TPC command is for one time slot, or the current TPC commands form a sequence of TPC commands, where each TPC command is for one time slot.

The base station 301 further comprises a transmitting port 707 which is configured to transmit a sequence of TPC commands comprising the first number of historical TPC commands and the second number of current TPC commands to the user equipment 310 to adjust the user equipment's 310 transmission power, so as to alter the net-rate of power change provided per historical TPC command.

The base station 301 comprises a receiving port 708 configured to receive the signal according to the adjusted transmission power from the user equipment 310.

The present embodiments for using TPC for uplink power control may be implemented through one or more processors, such as a processor 710 in the base station 301 depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the base station 301. One such carrier may be in the form of a CD ROM disc. It is however feasible with other data carriers such as a memory stick. The computer program code may furthermore be provided as pure program code on a server and downloaded to the base station 301.

Alternative embodiments of the base station 301 may comprise additional components responsible for providing additional functionality, including any of the functionality identified above and/or any functionality necessary to support the embodiments described herein.

Those skilled in the art will also appreciate that the determining unit 701, the transmitting port 705, the memory 707, the receiving port 708 and the processor 710 described above may refer to a combination of analog and digital circuits, and/or one or more processors configured with software and/or firmware, e.g. stored in the memory 707, that when executed by the one or more processors such as the processor 710 as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Some of the exemplifying embodiments described above may be summarized in the following manner:

A first embodiment described above is directed to a method in a base station for adjusting transmission power in a user equipment. The base station is configured to communicate with the user equipment over a communications link. The method comprises the actions of: determining a first number m; P of historical transmit power control, TPC, commands based on a signal power and an interference level; and determining a second number 2k; n+Q of current TPC commands based on the first number m; P of historical TPC commands, or based on the first number m; P of historical TPC commands and a third number n−K of signal power and interference level pairs; and transmitting a sequence of TPC commands comprising the first number of historical TPC commands and the second number of current TPC commands to the user equipment to adjust the user equipment's transmission power, preferably such the net-rate of power change provided by the sequence of TPC commands is different compared to the net-rate of power change provided the historical TPC commands.

In the method the determining of the current TPC commands may further comprise the actions of: determining whether a first historical TPC command is equal to or different from a second historical TPC command, wherein the first historical TPC command is older than the second historical TPC command; and determining a current TPC command to be equal to minus the second historical TPC command when the first historical TPC command is determined to be equal to the second historical TPC command; and determining the current TPC command based on a signal to interference plus noise ratio, SINR, when the first historical TPC command is determined to be different from the second historical TPC command.

The method may further comprise the actions of: determining that the base station is a serving base station serving the user equipment; and wherein the current TPC command is transmitted to the user equipment to adjust the transmission power when the base station is determined to be the serving base station.

The determining the current TPC based on a signal to interference plus noise ratio, SINR, when the first historical TPC command is determined to be different from the second historical TPC command may further comprise: comparing a target SINR with an estimate SINR; and determining an increase of the transmission power when the estimate SINR is lower than the target SINR; and determining a decrease of the transmission power when the estimate SINR is equal to or larger than the estimate SINR.

The target SINR may be predefined in the base station and the estimate SINR may be calculated by the base station based on a signal quality measurement done by the base station.

The first historical TPC command and the second historical TPC command may be stored in a computer readable memory comprised in the base station.

The current TPC command may be a predefined historical TPC command.

The first number m; P of historical TPC commands and the second number 2k; n+Q of current TPC commands may be constants and positive integer values and may comprise the value zero.

The predefined historical TPC commands may be +1 and −1, where +1 indicates a decrease of the transmission power and −1 indicates an increase of the transmission power.

The second number 2k; n+Q of current TPC commands may be determined based on a TPC delay and a transmission time interval, TTI, length measured by the base station.

The current TPC command may be for one time slot, or the current TPC commands may form a sequence of TPC commands, wherein each TPC command is for one time slot.

The communications link may be an uplink communications link, and the transmission power may be an output transmission power from the user equipment.

Some of the other exemplifying embodiments described above may be summarized in the following manner:

A second embodiment is directed to a base station configured to adjust transmission power in a user equipment and to communicate with the user equipment over a communications link. The base station comprises: a determining unit configured to: determine a first number m; P of historical transmit power control, TPC, commands based on a signal power and an interference level; and to determine a second number 2k; n+Q of current TPC command based on the first number m; P of historical TPC commands, or based on the first number m; P of historical TPC commands and a third number n–K of signal power and interference level pairs. In addition, the base station comprises a transmitting port configured to transmit a sequence of TPC commands comprising the first number of historical TPC commands and the second number of current TPC commands to the user equipment to adjust the user equipment's transmission power, preferably such the net-rate of power change provided by the sequence of TPC commands is different compared to the net-rate of power change provided the historical TPC commands.

The determining unit may be further configured to: determine whether a first historical TPC command is equal to or different from a second historical TPC command, wherein the first historical TPC command is older than the second historical TPC command; and to determine a current TPC command to be equal to minus the second historical TPC command when the first historical TPC command is determined to be equal to the second historical TPC command; and to determine a current TPC command based on a signal to interference plus noise ratio, SINR, when the first historical TPC command is determined to be different from the second historical TPC command.

The determining unit may be further configured to determine whether the base station is a serving base station serving the user equipment; and to transmit the current TPC command to the user equipment to adjust the transmission power when the base station is determined to be the serving base station.

The determining unit may be further configured to: compare a target SINR with an estimate SINR; and determine an increase of the transmission power when the estimate SINR is lower than the target SINR; and determine a decrease of the transmission power when the estimate SINR is equal to or larger than the estimate SINR.

The target SINR may be predefined in the base station. The estimate SINR may be calculated by the base station based on a signal quality measurement done by the base station.

The first historical TPC command and the second historical TPC command may be stored in a computer readable memory comprised by the base station.

The current TPC command may be a predefined historical TPC command.

The first number m; P of historical TPC commands and the second number 2k; n+Q of current TPC commands may be constants and positive integer values comprising the value zero.

The predefined historical TPC commands may be +1 and –1, where +1 indicates a decrease of the transmission power and –1 indicates an increase of the transmission power.

The determining unit may be configured to determine the second number 2k; n+Q of current TPC commands based on a TPC delay and a transmission time interval, TTI, length measured by the base station.

The current TPC command may be for one time slot, or the current TPC commands may form a sequence of TPC commands, wherein each TPC command is for one time slot.

It should be noted that TPC is used in both uplink and downlink, but the embodiments described above relates to the uplink, i.e. from the user equipment to the base station.

The embodiments herein are not limited to the above described preferred embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear.

The invention claimed is:

1. A method in a base station for adjusting transmission power in a user equipment when the base station communicates with the user equipment over a communications link, the method comprising:
   the base station determining a first number of historical transmit power control(TPC) commands based on a signal power and an interference level;
   the base station determining a second number of current TPC commands based on the first number of historical TPC commands, or based on the first number of historical TPC commands and a third number of signal power and interference level pairs; and
   the base station transmitting a sequence of TPC commands comprising the first number of historical TPC commands and the second number of current TPC commands to the user equipment to adjust the user equipment's transmission power.

2. The method according to claim 1, wherein the determining the current TPC commands further comprises:
   the base station determining whether a first historical TPC command is equal to or different from a second historical TPC command, wherein the first historical TPC command is older than the second historical TPC command;
   the base station determining a current TPC command to be equal to minus the second historical TPC command when the first historical TPC command is determined to be equal to the second historical TPC command; and
   the base station determining the current TPC command based on a signal to interference plus noise ratio, SINR, when the first historical TPC command is determined to be different from the second historical TPC command.

3. The method according to claim 2, wherein the determining the current TPC based on a signal to interference plus noise ratio(SINR) when the first historical TPC command is determined to be different from the second historical TPC command further comprises:
   the base station comparing a target SINR with an estimate SINR;
   the base station determining an increase of the transmission power when the estimate SINR is lower than the target SINR; and
   the base station determining a decrease of the transmission power when the estimate SINR is equal to or larger than the estimate SINR.

4. The method according to claim 3, wherein the target SINR is predefined in the base station and wherein the estimate SINR is calculated by the base station based on a signal quality measurement done by the base station.

5. The method according to claim 2, wherein the first historical TPC command and the second historical TPC command are stored in a computer readable memory comprised in the base station.

6. The method according to claim 1, further comprising:
the base station determining that the base station is a serving base station serving the user equipment; and wherein the current TPC command is transmitted to the user equipment to adjust the transmission power when the base station is determined to be the serving base station.

7. The method according to claim 1, wherein the current TPC command is a predefined historical TPC command.

8. The method according to claim 7, wherein the predefined historical TPC commands are +1 and −1, where +1 indicates a decrease of the transmission power and −1 indicates an increase of the transmission power.

9. The method according to claim 1, wherein the first number of historical TPC commands and the second number of current TPC commands are constants and positive integer values and comprising the value zero.

10. The method according to claim 1, wherein the second number of current TPC commands is determined based on a TPC delay and a transmission time interval TTI length measured by the base station.

11. The method according to claim 1, wherein the current TPC command is for one time slot, or wherein the current TPC commands form a sequence of TPC commands, wherein each TPC command is for one time slot.

12. The method according to claim 1, wherein the communications link is an uplink communications link, and wherein the transmission power is output transmission power from the user equipment.

13. The method according to claim 1, wherein the historical TPC commands and current TPC commands are discrete integer values that indicate a decrease or increase of transmission power.

14. The method according to claim 1, wherein the determining the current TPC commands further comprises:
the base station determining whether a first historical TPC command is equal to or different from a second historical TPC command, wherein the first historical TPC command is older than the second historical TPC command.

15. The method according to claim 14, where determining the current TPC commands further comprises:
the base station determining a current TPC command to be equal to minus the second historical TPC command in response to determining that the first historical TPC command is determined to be equal to the second historical TPC command.

16. A base station configured to adjust transmission power in a user equipment and to communicate with the user equipment over a communications link, the base station comprising:
a determining unit configured to: (a) determine a first number of historical transmit power control, TPC, commands based on a signal power and an interference level; and (b) determine a second number of current TPC command based on the first number of historical TPC commands, or based on the first number of historical TPC commands and a third number of signal power and interference level pairs; and
a transmitting port configured to transmit a sequence of TPC commands comprising the first number of historical TPC commands and the second number of current TPC commands to the user equipment to adjust the user equipment's transmission power.

17. The base station according to claim 16, wherein the determining unit is further configured to:
determine whether a first historical TPC command is equal to or different from a second historical TPC command, wherein the first historical TPC command is older than the second historical TPC command;
determine a current TPC command to be equal to minus the second historical TPC command when the first historical TPC command is determined to be equal to the second historical TPC command; and
determine a current TPC command based on a signal to interference plus noise ratio (SINR) when the first historical TPC command is determined to be different from the second historical TPC command.

18. The base station according to claim 16, wherein the determining unit is further configured to determine whether the base station is a serving base station serving the user equipment; and to transmit the current TPC command to the user equipment to adjust the transmission power when the base station is determined to be the serving base station.

19. The base station according to claim 16, wherein the determining unit is further configured to:
compare a target SINR with an estimate SINR;
determine an increase of the transmission power when the estimate SINR is lower than the target SINR; and
determine a decrease of the transmission power when the estimate SINR is equal to or larger than the estimate SINR.

20. The base station according to claim 19, wherein the target SINR is predefined in the base station and wherein the estimate SINR is calculated by the base station based on a signal quality measurement done by the base station.

21. The base station according to claim 20, wherein the current TPC command is a predefined historical TPC command.

22. The base station according to claim 21, wherein the predefined historical TPC commands are +1 and −1, where +1 indicates a decrease of the transmission power and −1 indicates an increase of the transmission power.

23. The base station according to claim 16, wherein the first historical TPC command and the second historical TPC command are stored in a computer readable memory comprised in the base station.

24. The base station according to claim 16, wherein the first number of historical TPC commands and the second number of current TPC commands are constants and positive integer values comprising the value zero.

25. The base station according to claim 16, wherein the determining unit is configured to determine the second number of current TPC commands based on a TPC delay and a transmission time interval (TTI) length measured by the base station.

26. The base station according to claim 16, wherein the current TPC command is for one time slot, or wherein the current TPC commands form a sequence of TPC commands, wherein each TPC command is for one time slot.

27. The base station according to claim 16, wherein the historical TPC commands and current TPC commands are discrete integer values that indicate a decrease or increase of transmission power.

* * * * *

UNITED STATES PATENT AND TRADEMARK OFFICE
CERTIFICATE OF CORRECTION

PATENT NO. : 8,971,950 B2  
APPLICATION NO. : 13/369559  
DATED : March 3, 2015  
INVENTOR(S) : Lamm et al.

Page 1 of 1

It is certified that error appears in the above-identified patent and that said Letters Patent is hereby corrected as shown below:

In the Specification

In Column 9, Line 46, delete "RLS" and insert -- $RLS\_$ --, therefor.

In Column 9, Line 62, delete "SINK_low," and insert -- $SINR\_low$, --, therefor.

In Column 10, Line 58, delete "slots n, . . . ," and insert -- slots n, n-1, . . . , --, therefor.

Signed and Sealed this  
Twenty-ninth Day of September, 2015

Michelle K. Lee  
*Director of the United States Patent and Trademark Office*